United States Patent
Takeda et al.

(10) Patent No.: US 12,549,313 B2
(45) Date of Patent: Feb. 10, 2026

(54) RANDOM ACCESS PROCEDURE USING SECONDARY CELL DOWNLINK CHANNEL

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Yiqing Cao, Beijing (CN); Alberto Rico Alvarino, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/758,272

(22) PCT Filed: Jan. 29, 2020

(86) PCT No.: PCT/CN2020/074066
§ 371 (c)(1),
(2) Date: Jun. 30, 2022

(87) PCT Pub. No.: WO2021/151227
PCT Pub. Date: Aug. 5, 2021

(65) Prior Publication Data
US 2023/0055673 A1    Feb. 23, 2023

(51) Int. Cl.
*H04L 5/00*    (2006.01)
*H04W 74/00*    (2009.01)
*H04W 74/0833*    (2024.01)

(52) U.S. Cl.
CPC ......... *H04L 5/0053* (2013.01); *H04W 74/006* (2013.01); *H04W 74/0833* (2013.01)

(58) Field of Classification Search
CPC ........... H04W 74/006; H04W 74/0833; H04W 74/0836; H04W 74/0838; H04L 5/0044; H04L 5/0053; H04L 5/0094
See application file for complete search history.

(56) References Cited

U.S. PATENT DOCUMENTS

| 2014/0161110 A1 | 6/2014 | Kim et al. |
| 2014/0226614 A1 | 8/2014 | Kato et al. |

(Continued)

FOREIGN PATENT DOCUMENTS

| CN | 102231917 A | 11/2011 |
| CN | 102271418 A | 12/2011 |

(Continued)

OTHER PUBLICATIONS

Huawei, HiSilicon ("Correction on RNTI used for UE specific PDSCH/PUSCH", 3GPP TSG-RAN WG1 Meeting #99, R1-1913124, Nov. 18-22, 2019) (Year: 2019).*

(Continued)

*Primary Examiner* — Ji-Hae Yea
(74) *Attorney, Agent, or Firm* — Harrity & Harrity, LLP (57) ABSTRACT

Various aspects of the present disclosure generally relate to wireless communication. In some aspects, a user equipment may determine to initiate a random access procedure for a primary cell; and receive, on a secondary cell of the primary cell, at least one physical downlink control channel communication conveying information associated with the random access procedure for the primary cell. Numerous other aspects are provided.

21 Claims, 5 Drawing Sheets

(56) References Cited

U.S. PATENT DOCUMENTS

| | | | |
|---|---|---|---|
| 2018/0098359 A1* | 4/2018 | Patel | H04L 5/0048 |
| 2018/0176961 A1 | 6/2018 | Babaei et al. | |
| 2019/0357260 A1 | 11/2019 | Cirik et al. | |
| 2020/0329490 A1* | 10/2020 | Suzuki | H04L 5/0055 |
| 2022/0104049 A1* | 3/2022 | Lee | H04B 7/0408 |
| 2022/0159733 A1* | 5/2022 | Cirik | H04L 5/0053 |
| 2022/0167279 A1* | 5/2022 | Zhou | H04W 52/146 |
| 2022/0279588 A1* | 9/2022 | Mu | H04W 74/004 |
| 2022/0312451 A1* | 9/2022 | Aiba | H04W 24/08 |

FOREIGN PATENT DOCUMENTS

| | | |
|---|---|---|
| CN | 102325382 A | 1/2012 |
| EP | 3065488 A1 | 9/2016 |
| KR | 20150051093 A | 5/2015 |

OTHER PUBLICATIONS

U.S. Appl. No. 62/880,880, Drawings-only_black_and_white_line_drawings, filed Jul. 31, 2019 (Year: 2019).*

U.S. Appl. No. 62/880,880, Specification, filed Jul. 31, 2019 (Year: 2019).*

U.S. Appl. No. 62/882,069, Drawings-only_black_and_white_line_drawings, filed Aug. 2, 2019 (Year: 2019).*

U.S. Appl. No. 62/882,069, Specification, filed Aug. 2, 2019 (Year: 2019).*

U.S. Appl. No. 62/886,635, Specification, filed Aug. 14, 2019 (Year: 2019).*

U.S. Appl. No. 62/864,969, Specification, filed Jun. 21, 2019 (Year: 2019).*

Huawei, et al., "Correction on RNTI Used for UE Specific PDSCH/PUSCH," 3GPP TSG-RAN WG1 Meeting #99, R1-1913124, Nov. 18-22, 2019, Nov. 9, 2019 (Nov. 9, 2019), the whole document, 10 pages.

International Search Report and Written Opinion—PCT/CN2020/074066—ISA/EPO—Oct. 27, 2020.

Supplementary European Search Report—EP20916459—Search Authority—The Hague—Aug. 25, 2023.

NTT Docomo Inc: "CR on QCL Assumption for Receiving PDCCH for RAR", 3GPP TSG RAN WG1 Meeting #96, R1-1903506, No. Athens, Greece, Feb. 25, 2019-Mar. 1, 2019, 4 Pages.

* cited by examiner

RANDOM ACCESS PROCEDURE USING SECONDARY CELL DOWNLINK CHANNEL

CROSS-REFERENCE TO RELATED APPLICATION

This Application is a 371 National Stage of PCT Application No. PCT/CN2020/074066 filed on Jan. 29, 2020, entitled "RANDOM ACCESS PROCEDURE USING SECONDARY CELL DOWNLINK CHANNEL," which is hereby expressly incorporated by reference herein.

FIELD OF THE DISCLOSURE

Aspects of the present disclosure generally relate to wireless communication and to techniques and apparatuses for random access procedures using secondary cell downlink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining to initiate a random access procedure for a primary cell; and receiving, on a secondary cell of the primary cell, at least one physical downlink control channel (PDCCH) communication conveying information associated with the random access procedure for the primary cell.

In some aspects, a UE for wireless communication may include a memory and one or more processors operatively coupled to the memory. The memory and the one or more processors may be configured to determine to initiate a random access procedure for a primary cell; and receive, on a secondary cell of the primary cell, at least one PDCCH communication conveying information associated with the random access procedure for the primary cell.

In some aspects, a non-transitory computer-readable medium may store one or more instructions for wireless communication. The one or more instructions, when executed by one or more processors of a UE, may cause the one or more processors to determine to initiate a random access procedure for a primary cell; and receive, on a secondary cell of the primary cell, at least one PDCCH communication conveying information associated with the random access procedure for the primary cell.

In some aspects, an apparatus for wireless communication may include means for determining to initiate a random access procedure for a primary cell; and means for receiving, on a secondary cell of the primary cell, at least one PDCCH communication conveying information associated with the random access procedure for the primary cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
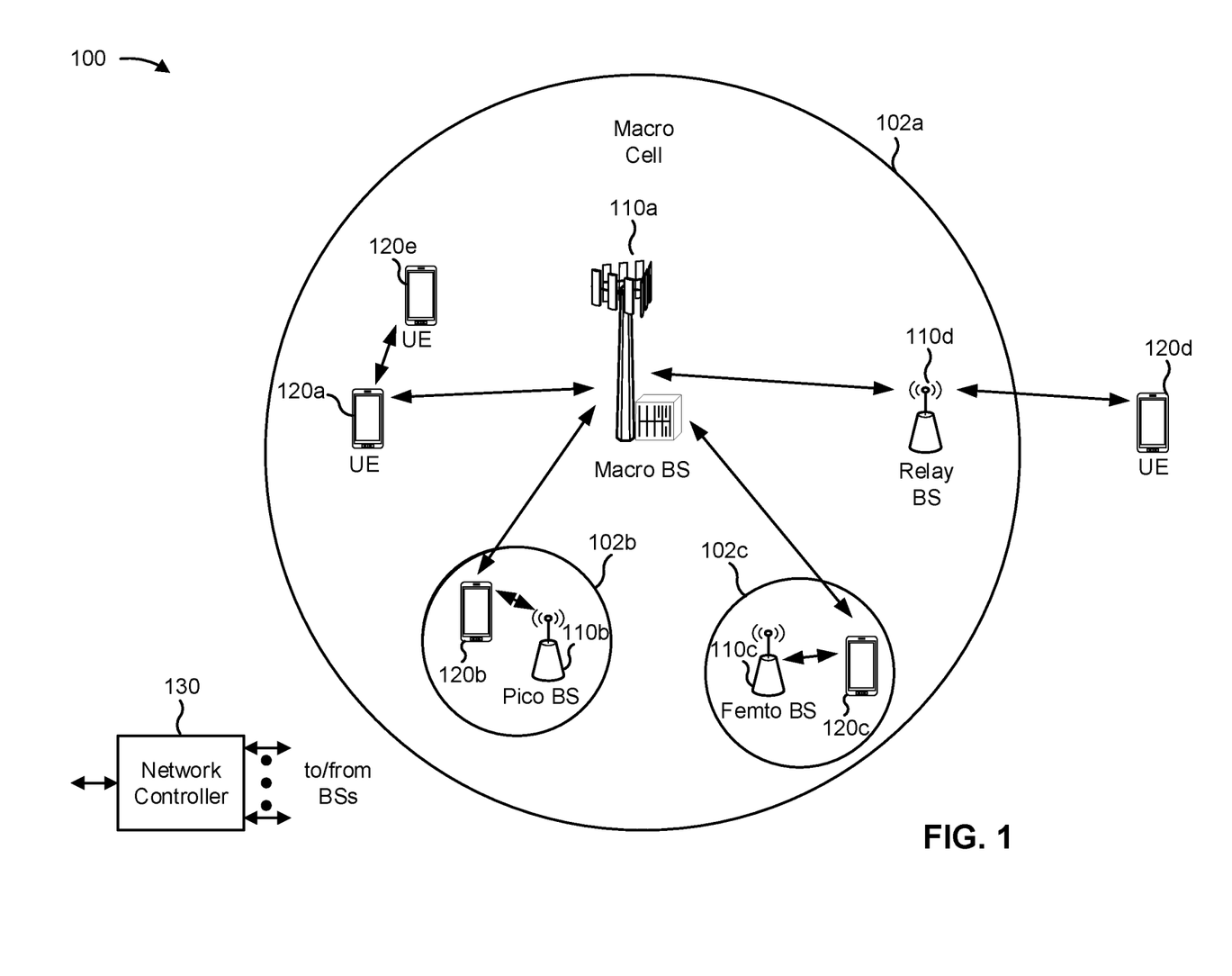
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced.

The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
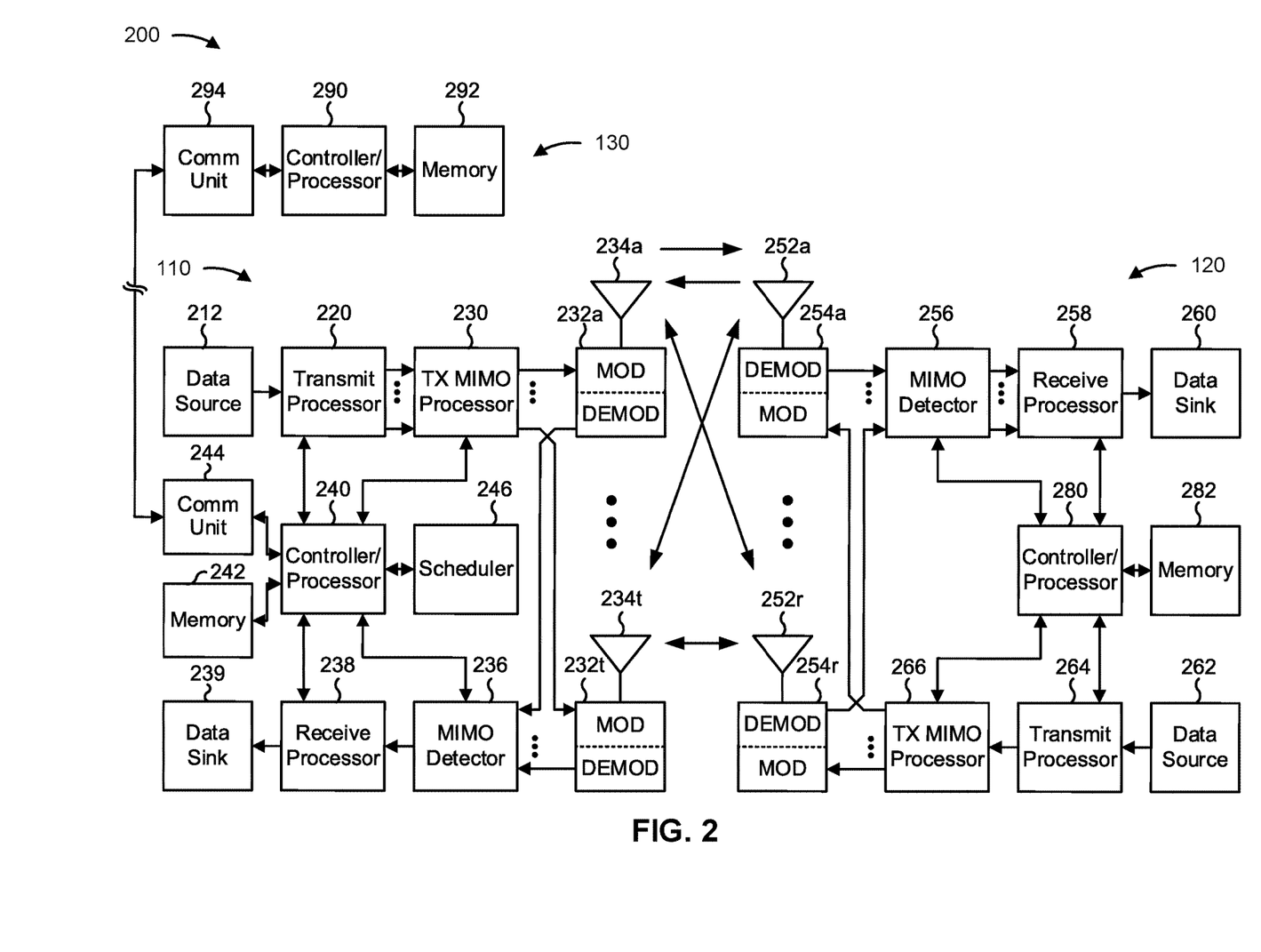
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a random access procedure using a secondary cell downlink channel, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, and/or other processes as described herein. A scheduler 246 may schedule UEs for data transmission on the downlink and/or uplink.

In some aspects, UE 120 may include means for determining to initiate a random access procedure for a primary cell, means for receiving, on a secondary cell of the primary cell, at least one physical downlink control channel (PDCCH) communication conveying information associated with the random access procedure for the primary cell, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, a UE may have access to a plurality of cells. For example, the UE may monitor for communication on a primary cell, a secondary cell, a primary secondary cell (e.g., of a plurality of secondary cells that the UE is configured to monitor), and/or the like. The UE may receive a physical downlink shared channel (PDSCH) or transmit a physical uplink shared channel (PUSCH) on the primary cell. In this case, the secondary cell may be configured as a scheduling cell for the primary cell. For example, the UE may monitor for a PDCCH on the secondary cell. The UE may receive, on the secondary cell, a downlink control information (DCI) scheduling, for example, the PDSCH or the PUSCH. A random access (RA) procedure may occur for a primary cell. However, for the RA procedure to occur for the primary cell, the UE may monitor for a PDCCH on the primary cell to enable the RA procedure. As a result, the UE may use excessive processing resources, excessive power resources, and/or excessive network resources by monitoring for the PDCCH on both the primary cell and the secondary cell.

Some aspects described herein enable an RA procedure using a secondary cell downlink channel. For example, the UE may monitor for and receive a PDCCH on the secondary cell, which may convey information associated with an RA procedure for the primary cell. In this way, the UE may avoid monitoring for the PDCCH on both the primary cell and the secondary cell, thereby reducing a utilization of processing resources, power resources, and/or network resources.

Figure 3A:
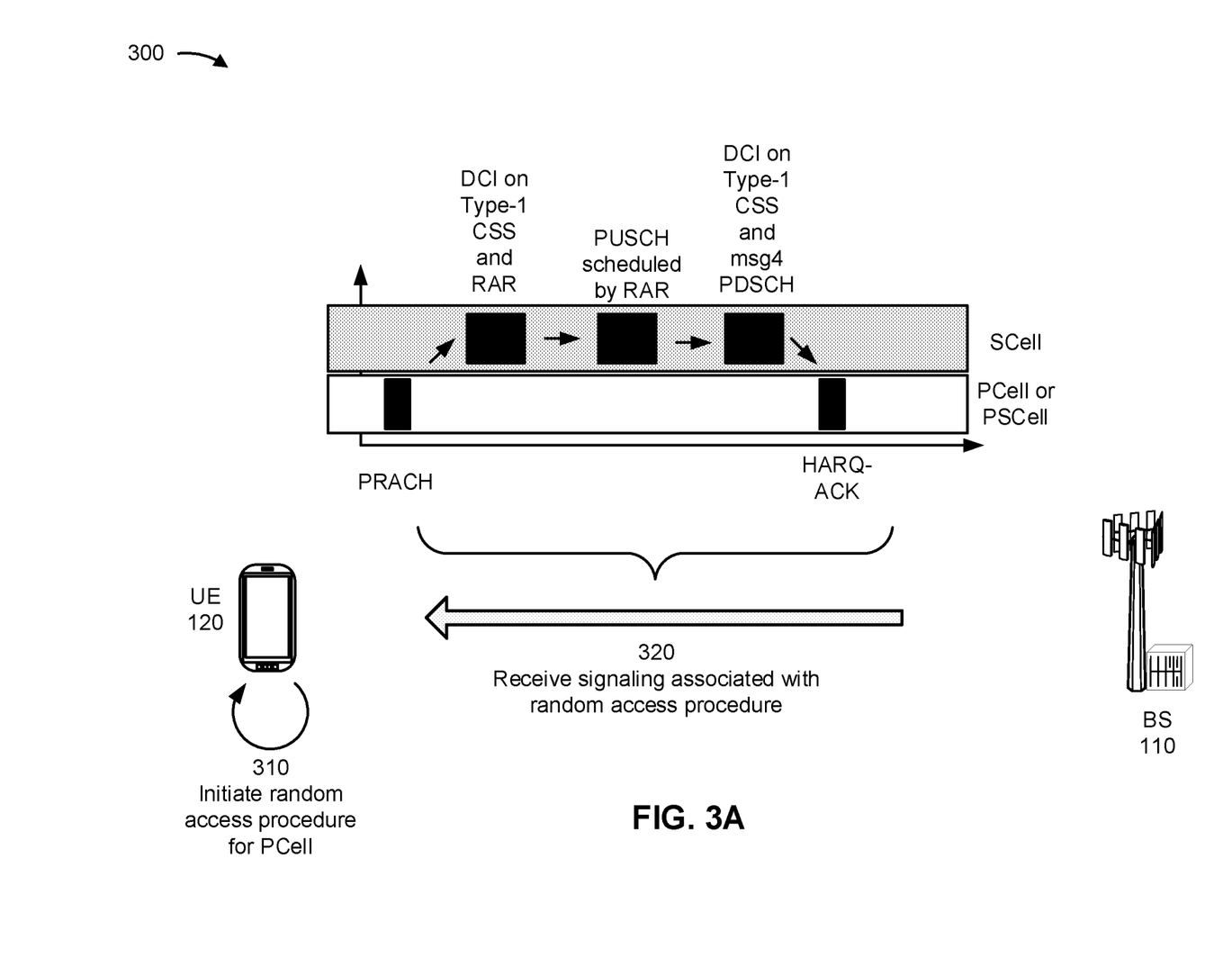
FIGS. 3A and 3B are diagrams illustrating examples of a random access procedure using a secondary cell downlink channel, in accordance with various aspects of the present disclosure.
Figure 3B:
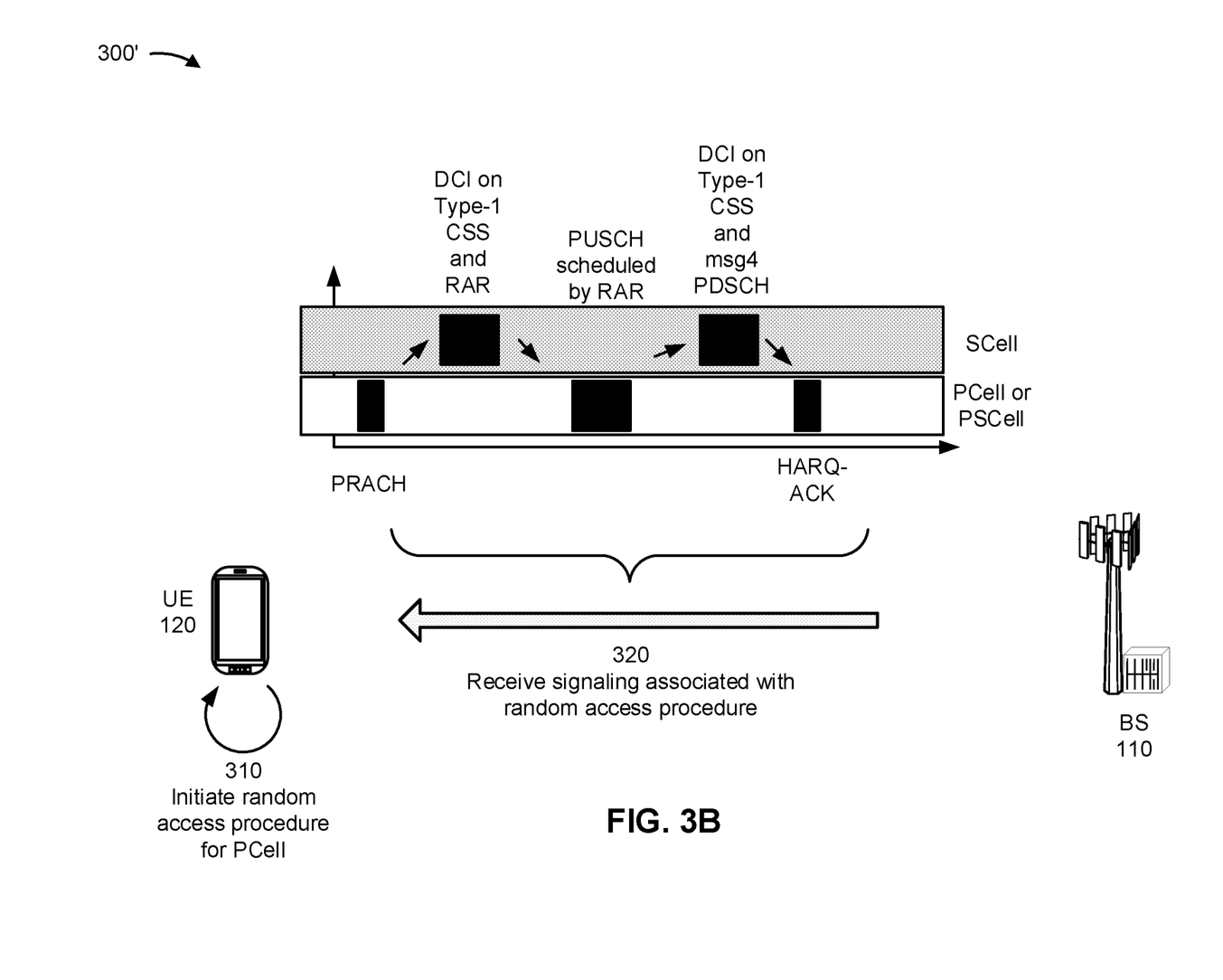

FIGS. 3A and 3B are diagrams illustrating examples 300/300' of an RA procedure using a secondary cell downlink channel, in accordance with various aspects of the present disclosure. As shown in FIGS. 3A and 3B, examples 300/300' include a BS 110 and a UE 120.

As further shown in FIG. 3A, and by reference number 310, UE 120 may determine to initiate an RA procedure for a primary cell (PCell) or primary secondary cell (PSCell). For example, UE 120 may determine to monitor for a PDCCH on a secondary cell (SCell) to initiate a data transfer, obtain timing information, obtain synchronization information, and/or the like for the primary cell. In some aspects, UE 120 may receive configuration information associated with configuring monitoring for the PDCCH on the secondary cell. For example, UE 120 may receive information identifying a common search space (CSS) (e.g., a type-1 CSS) on the secondary cell in connection with a UE-specific search space (USS) for which cross-carrier scheduling is to be monitored. In this case, UE 120 may monitor the type-1 CSS on the secondary cell to receive a random access (RA) response (RAR) granted PDSCH (e.g., a downlink control information (DCI) type 1_0 with a cyclic redundancy check (CRC) scrambled based at least in part on an RA radio network temporary identifier (RA-RNTI)), a retransmission of an RAR granted PUSCH (e.g., a DCI type 0_0 with a CRC scrambled based at least in part on a cell RNTI (C-RNTI) or a temporary C-RNTI (TC-RNTI)), a scheduling PDSCH message type 4 (msg4) (e.g., a DCI type 1_0 with a CRC scrambled based at least in part on a TC-RNTI), and/or the like.

As further shown in FIG. 3A, and by reference number 320, UE 120 may communicate signaling associated with an RA procedure. For example, UE 120 may receive at least one PDCCH communication on the secondary cell to enable the RA procedure for the primary cell (or the primary secondary cell). In some aspects, UE 120 may receive or transmit at least one communication of the RA procedure on the primary cell. For example, UE 120 may receive a physical random access channel (PRACH) and transmit a physical uplink control channel (PUCCH) on the primary cell in connection with the RA procedure. In this case, as shown in FIG. 3A, UE 120 may receive a PRACH transmission on the primary cell (or a primary secondary cell), receive a PDCCH with a DCI type 1_0 in a type-1 CSS and a corresponding scheduled RAR grant on the secondary cell, transmit a PUSCH scheduled by the RAR grant on the secondary cell, receive a PDCCH with a DCI type 1_0 in a type-1 CSS and an associated msg4 PDSCH on the secondary cell, and may transmit a hybrid automatic repeat request (HARD) acknowledgement (ACK) on a PUCCH on the primary cell (or primary secondary cell).

In some aspects, UE 120 may determine a quasi co-location (QCL) parameter for the DCI type 1_0 received on the secondary cell in the type-1 CSS (e.g., the DCI that schedules an RAR granted PDSCH). For example, UE 120 may determine that the QCL parameter is the same QCL parameter as is used for a synchronization signal (SS)/physical broadcast channel (PBCH) block. Additionally, or alternatively, UE 120 may determine that the QCL parameter is the same as is used for a channel state information reference signal (CSI-RS) resource that UE 120 used for a PRACH association transmission. Additionally, or alternatively, UE 120 may determine the spatial domain filter, spatial domain relation, and/or the transmission or reception beam, based at least in part on the QCL parameter used for the SS/PBCH block, the CSI-RS resource, a combination thereof, and/or the like. In some aspects, UE 120 may determine the QCL parameter independently of whether a QCL parameter is indicated by a transmission configuration indicator (TCI) state for a control resource set (CORESET) where UE 120 receives a PDCCH with a DCI format type 1_0. Alternatively, UE 120 may use a QCL parameter indicated by a TCI-state for the CORESET where UE 120 receives the PDCCH with a DCI format type 1_0. In some aspects, UE 120 may determine a transform precoder for the PUSCH scheduled by the RAR grant (e.g., a PUSCH on the secondary cell). For example, UE 120 may select a transform precoder in a random access channel (RACH) configuration common message (e.g., that is configured on the primary cell). Alternatively, UE 120 may select a transform precoder configured on the secondary cell.

In contrast, as shown in FIG. 3B, UE 120 may transmit the PUSCH scheduled by the RAR grant on the primary cell. For example, UE 120 may transmit the RAR granted PUSCH on the primary cell based at least in part on the PUSCH being scheduled by an RAR grant on the secondary cell or a DCI format type 0_0 with a CRC scrambled by a TC-RNTI on the secondary cell. In some aspects, UE 120 may determine a bandwidth part size for the secondary cell for the RAR granted PUSCH based at least in part on a frequency domain resource allocation indicator of the DCI format type 0_0. Additionally, or alternatively, UE 120 may determine the bandwidth part size for the primary cell for the RAR granted PUSCH based at least in part on a frequency domain resource allocation indicator of the DCI format type 0_0.

In some aspects, UE 120 may receive a PDCCH to trigger a retransmission of the RAR granted PUSCH on the primary cell. For example, UE 120 may monitor the type-1 CSS on the secondary cell to receive a DCI type 1_0 scheduling the RAR granted PDSCH and the msg4 PDSCH, and may monitor the type-1 CSS on the primary cell to receive a DCI type 0_0 scheduling the retransmission of the RAR granted PDSCH. In this case, UE 120 utilizes resources of both cells to enable efficient transmission and triggering of retransmission of the RAR granted PDSCH.

As indicated above, FIGS. 3A and 3B are provided as examples. Other examples may differ from what is described with respect to FIGS. 3A and 3B.

Figure 4:
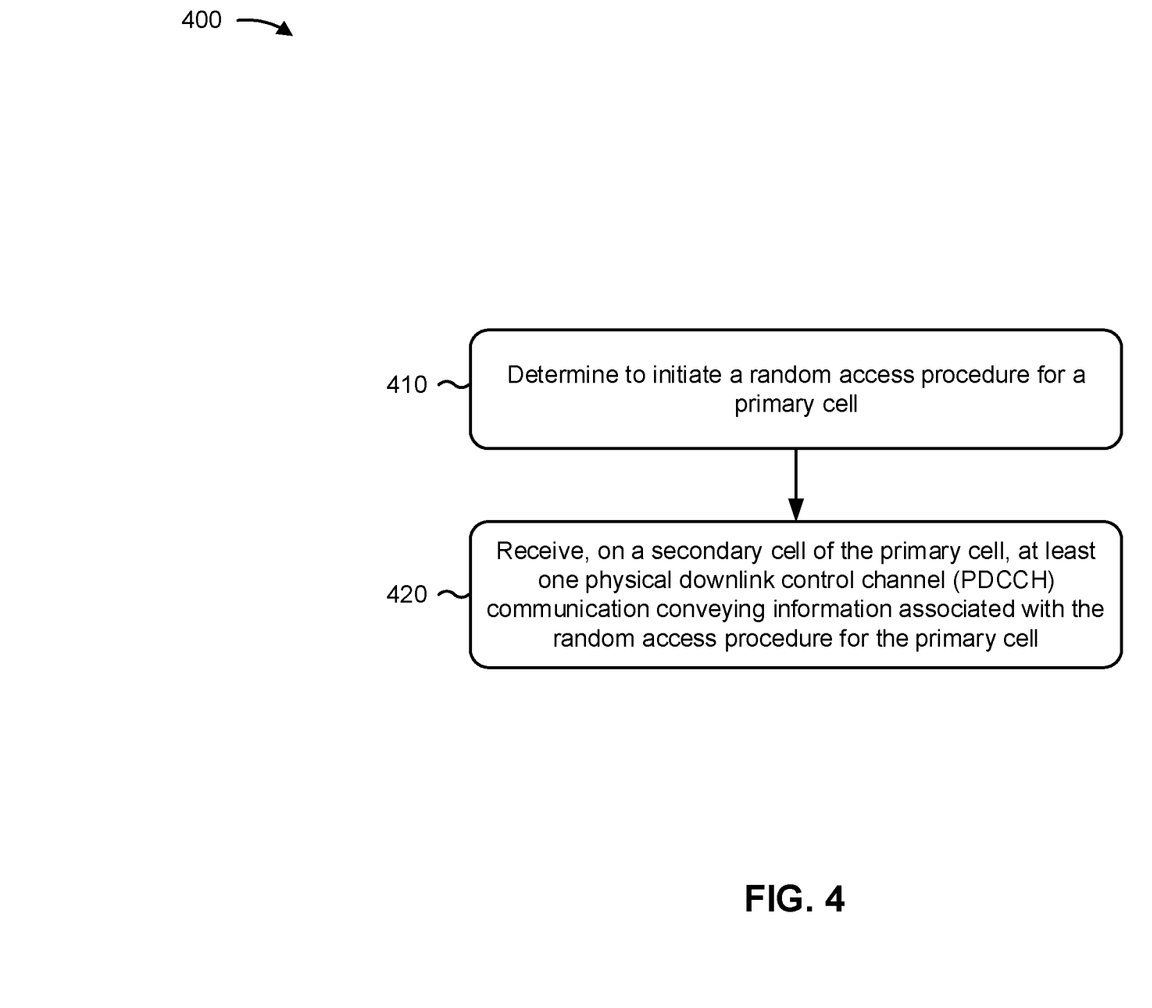
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with a random access procedure using a secondary cell downlink channel.

As shown in FIG. 4, in some aspects, process 400 may include determining to initiate a random access procedure for a primary cell (block 410). For example, the UE (e.g., using receive processor 258, transmit processor 264, controller/processor 280, memory 282, and/or the like) may determine to initiate a random access procedure for a primary cell, as described above.

As further shown in FIG. 4, in some aspects, process 400 may include receiving, on a secondary cell of the primary cell, at least one PDCCH communication conveying information associated with the random access procedure for the primary cell (block 420). For example, the UE (e.g., using receive processor 258, transmit processor 264, controller/processor 280, memory 282, and/or the like) may receive, on a secondary cell of the primary cell, at least one PDCCH communication conveying information associated with the random access procedure for the primary cell, as described above.

Process 400 may include additional aspects, such as any single aspect or any combination of aspects described below and/or in connection with one or more other processes described elsewhere herein.

In a first aspect, receiving the at least one PDCCH communication includes monitoring a common search space (CSS) on the secondary cell to receive the at least one PDCCH communication.

In a second aspect, alone or in combination with the first aspect, the common search space is a type-1 CSS on which a downlink control information is received with a cyclic redundancy check scrambled based at least in part on a random access radio network temporary identifier or a temporary cell radio network temporary identifier.

In a third aspect, alone or in combination with one or more of the first and second aspects, receiving the at least one PDCCH communication includes monitoring a UE specific search space configured for cross-carrier scheduling to receive the at least one PDCCH communication.

In a fourth aspect, alone or in combination with one or more of the first through third aspects, the at least one PDCCH communication includes at least one downlink control information message.

In a fifth aspect, alone or in combination with one or more of the first through fourth aspects, the at least one PDCCH communication includes at least one of a scheduling random access response physical downlink shared channel, a scheduling retransmission of a random access response granted physical uplink shared channel, or a scheduling message type 4 (msg4) physical downlink shared channel.

In a sixth aspect, alone or in combination with one or more of the first through fifth aspects, process 400 includes transmitting, on the primary cell, a physical random access channel communication or a physical uplink control channel communication conveying a feedback message for a msg4 physical downlink shared channel communication.

In a seventh aspect, alone or in combination with one or more of the first through sixth aspects, a quasi co-location (QCL) parameter for a control resource set (CORESET) for a downlink control information on a type-1 CSS that schedules a random access response physical downlink shared channel is based at least in part on a resource associated with the physical random access channel communication, and the resource is at least one of a synchronization signal resource, a physical broadcast channel block resource, or a channel state information reference signal resource.

In an eighth aspect, alone or in combination with one or more of the first through seventh aspects, a QCL parameter for a downlink control information on a type-1 CSS that schedules a random access response physical downlink shared channel is based at least in part on a transmission configuration indicator state for a control resource set associated with the at least one PDCCH communication.

In a ninth aspect, alone or in combination with one or more of the first through eighth aspects, a transform precoder for a physical uplink shared channel, on the secondary cell, scheduled by a random access response grant is based at least in part on a transform precoder in a random access channel message on the primary cell.

In a tenth aspect, alone or in combination with one or more of the first through ninth aspects, a transform precoder for a physical uplink shared channel, on the secondary cell, scheduled by a random access response grant, is based at least in part on a transform precoder configured on the secondary cell.

In an eleventh aspect, alone or in combination with one or more of the first through tenth aspects, process 400 includes transmitting, on the primary cell, a physical uplink shared channel communication granted by a random access response.

In a twelfth aspect, alone or in combination with one or more of the first through eleventh aspects, the physical uplink shared channel communication granted by the random access response is transmitted on the primary cell based at least in part on a random access response uplink grant or a downlink control information message received on the secondary cell.

In a thirteenth aspect, alone or in combination with one or more of the first through twelfth aspects, a frequency domain resource allocation of the downlink control information message is based at least in part on a bandwidth part size of the secondary cell or the primary cell.

In a fourteenth aspect, alone or in combination with one or more of the first through thirteenth aspects, process 400 includes receiving, on the primary cell, a particular PDCCH communication to trigger a retransmission of a physical uplink shared channel granted by a random access response.

In a fifteenth aspect, alone or in combination with one or more of the first through fourteenth aspects, process 400 includes monitoring a type-1 CSS on the secondary cell and on the primary cell to receive the at least one PDCCH communication and the particular PDCCH communication.

In a sixteenth aspect, alone or in combination with one or more of the first through fifteenth aspects, process 400 includes receiving, in the type-1 CSS on the secondary cell, at least one of a scheduling random access response physical downlink shared channel (PDSCH) or a msg4 PDSCH.

In a seventeenth aspect, alone or in combination with one or more of the first through sixteenth aspects, process 400 includes receiving, in the type-1 CSS on the primary cell, a message scheduling a retransmission of a physical uplink shared channel granted by a random access response.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining to initiate a random access procedure for a primary cell;
    monitoring for at least one physical downlink control channel (PDCCH) communication on a secondary cell of the primary cell;
    receiving, on the secondary cell, the at least one PDCCH communication, the at least one PDCCH communication conveying information associated with the random access procedure for the primary cell, wherein the at least one PDCCH communication includes a scheduling message type 4 (msg4) physical downlink shared channel (PDSCH) communication;
    transmitting, on the primary cell, a physical uplink control channel (PUCCH) communication conveying a feedback message for the scheduling msg4 PDSCH communication; and
    receiving, on the secondary cell, a downlink control information message associated with a random access response granted physical uplink shared channel (PUSCH) communication, wherein a frequency domain resource allocation of the downlink control information message is based at least in part on a bandwidth part size of a cell that is different from a cell that the downlink control information message is received on, the cell that the downlink control information message is received on comprising the secondary cell.

2. The method of claim 1, wherein the monitoring for the at least one PDCCH communication comprises:
monitoring a common search space on the secondary cell to receive the at least one PDCCH communication.

3. The method of claim 2, wherein the common search space is a type-1 common search space (CSS) on which the downlink control information message is received with a cyclic redundancy check scrambled based at least in part on a random access radio network temporary identifier or a temporary cell radio network temporary identifier.

4. The method of claim 1, wherein the monitoring for the at least one PDCCH communication comprises:
monitoring a UE specific search space configured for cross-carrier scheduling to receive the at least one PDCCH communication.

5. The method of claim 1, wherein the at least one PDCCH communication includes the downlink control information message.

6. The method of claim 1, wherein a quasi co-location (QCL) parameter for a control resource set (CORESET) for a downlink control information on a type-1 common search space (CSS) that schedules a random access response PDSCH is based at least in part on a resource associated with a physical random access channel (PRACH) communication, and wherein the resource is at least one of: a synchronization signal resource, a physical broadcast channel block resource, or a channel state information reference signal resource.

7. The method of claim 1, wherein a quasi co-location (QCL) parameter for a downlink control information on a type-1 common search space (CSS) that schedules a random access response PDSCH is based at least in part on a transmission configuration indicator state for a control resource set associated with the at least one PDCCH communication.

8. The method of claim 1, wherein a transform precoder for a PUSCH, on the secondary cell, scheduled by a random access response grant is based at least in part on a transform precoder in a random access channel message on the primary cell.

9. The method of claim 1, wherein a transform precoder for a PUSCH, on the secondary cell, scheduled by a random access response grant is based at least in part on a transform precoder configured on the secondary cell.

10. The method of claim 1, further comprising:
transmitting, on the primary cell, the random access response granted PUSCH communication.

11. The method of claim 10, wherein the random access response granted PUSCH communication is transmitted on the primary cell based at least in part on a random access response uplink grant or the downlink control information message.

12. The method of claim 11, wherein the downlink control information message comprises a downlink control information format type 0_0 with a cyclic redundancy check scrambled by a temporary cell radio network temporary identifier.

13. The method of claim 1, further comprising:
receiving, on the primary cell, a particular PDCCH communication to trigger a scheduling retransmission of the random access response granted PUSCH communication.

14. The method of claim 13, further comprising:
monitoring a type-1 common search space (CSS) on the secondary cell to receive the at least one PDCCH communication and the particular PDCCH communication.

15. The method of claim 14, further comprising:
receiving, in the type-1 CSS on the secondary cell, the scheduling msg4 PDSCH communication.

16. The method of claim 14, further comprising:
receiving, in the type-1 CSS on the primary cell, a message scheduling the scheduling retransmission of the random access response granted PUSCH communication.

17. The method of claim 1, further comprising:
receiving configuration information configuring the monitoring for the at least one PDCCH communication on the secondary cell.

18. A user equipment (UE) for wireless communication, comprising:
one or more memories; and
one or more processors coupled to the one or more memories, the one or more memories and the one or more processors configured to:
determine to initiate a random access procedure for a primary cell;
monitor for at least one physical downlink control channel (PDCCH) communication on a secondary cell of the primary cell;
receive, on the secondary cell, the at least one PDCCH communication, the at least one PDCCH communication conveying information associated with the random access procedure for the primary cell, wherein the at least one PDCCH communication includes a scheduling message type 4 (msg4) physical downlink shared channel (PDSCH) communication;
transmit, on the primary cell, a physical uplink control channel (PUCCH) communication conveying a feedback message for the scheduling msg4 PDSCH communication; and
receive, on the secondary cell, a downlink control information message associated with a random access response granted physical uplink shared channel (PUSCH) communication, wherein a frequency domain resource allocation of the downlink control information message is based at least in part on a bandwidth part size of a cell that is different from a cell that the downlink control information message is received on, the cell that the downlink control information message is received on comprising the secondary cell.

19. The UE of claim 18, wherein the one or more processors, to monitor for the at least one PDCCH communication, are configured to:
monitor a common search space on the secondary cell to receive the at least one PDCCH communication.

20. A non-transitory computer-readable medium storing one or more instructions for wireless communication, the one or more instructions comprising:
one or more instructions that, when executed by one or more processors of a user equipment (UE), cause the one or more processors to:
determine to initiate a random access procedure for a primary cell;
monitor for at least one physical downlink control channel (PDCCH) communication on a secondary cell of the primary cell;

receive, on the secondary cell, the at least one PDCCH communication, the at least one PDCCH communication conveying information associated with the random access procedure for the primary cell, wherein the at least one PDCCH communication includes a scheduling message type 4 (msg4) physical downlink shared channel (PDSCH) communication;

transmit, on the primary cell, a physical uplink control channel (PUCCH) communication conveying a feedback message for the scheduling msg4 PDSCH communication; and receive, on the secondary cell, a downlink control information message associated with a random access response granted physical uplink shared channel (PUSCH) communication, wherein a frequency domain resource allocation of the downlink control information message is based at least in part on a bandwidth part size of a cell that is different from a cell that the downlink control information message is received on, the cell that the downlink control information message is received on comprising the secondary cell.

21. An apparatus for wireless communication, comprising:

means for determining to initiate a random access procedure for a primary cell;

means for monitoring for at least one physical downlink control channel (PDCCH) communication on a secondary cell of the primary cell;

means for receiving, on the secondary cell, the at least one PDCCH communication, the at least one PDCCH communication conveying information associated with the random access procedure for the primary cell, wherein the at least one PDCCH communication includes a scheduling message type 4 (msg4) physical downlink shared channel (PDSCH) communication;

means for transmitting, on the primary cell, a physical uplink control channel (PUCCH) communication conveying a feedback message for the scheduling msg4 PDSCH communication; and means for receiving, on the secondary cell, a downlink control information message associated with a random access response granted physical uplink shared channel (PUSCH) communication, wherein a frequency domain resource allocation of the downlink control information message is based at least in part on a bandwidth part size of a cell that is different from a cell that the downlink control information message is received on, the cell that the downlink control information message is received on comprising the secondary cell.

* * * * *